Oct. 27, 1970  C. H. ZWEIFEL ET AL  3,536,351
APPARATUS FOR SIMULTANEOUSLY LIFTING AND SPACING
CARGO CONTAINERS
Filed Nov. 13, 1967  2 Sheets-Sheet 1
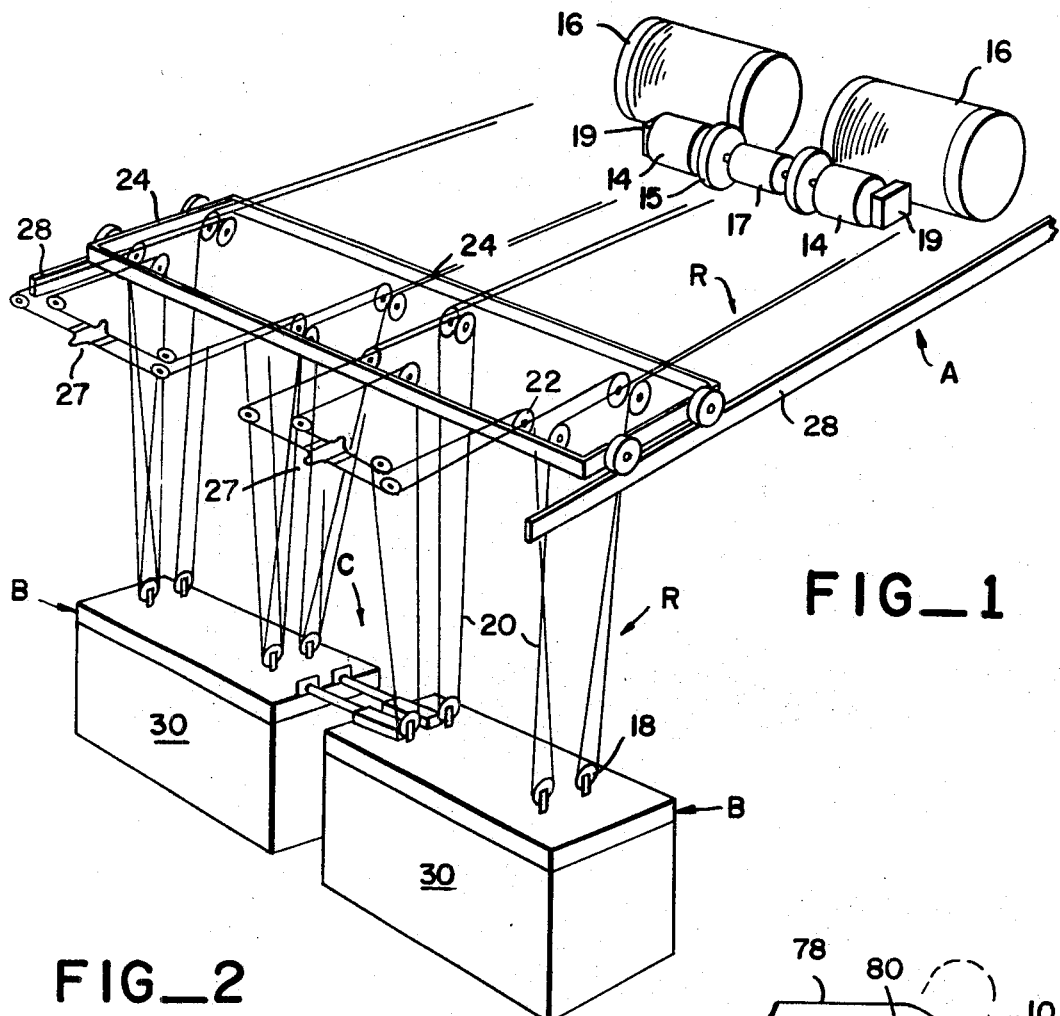
FIG_1
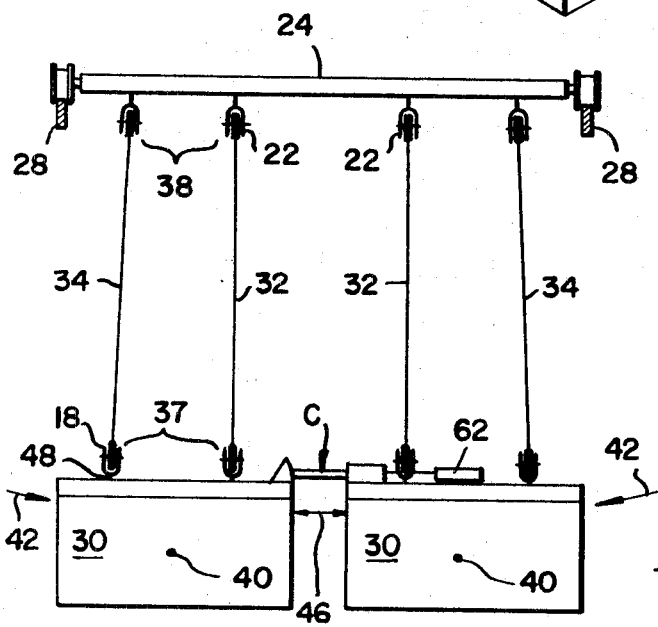
FIG_2
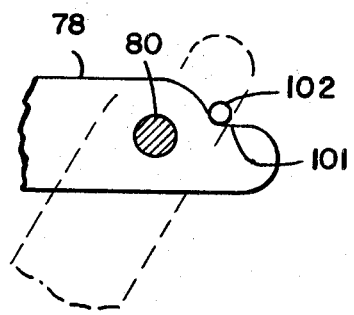
FIG_7
INVENTORS
CHARLES H. ZWEIFEL
ANTHONY J. DeSTASI
BY
Townsend and Townsend
ATTORNEYS

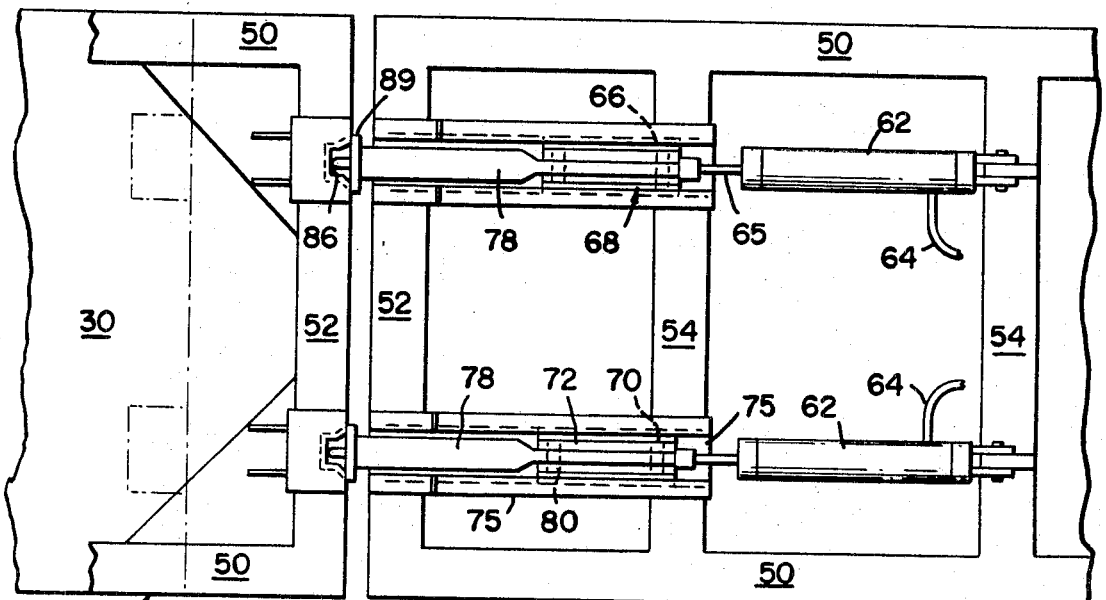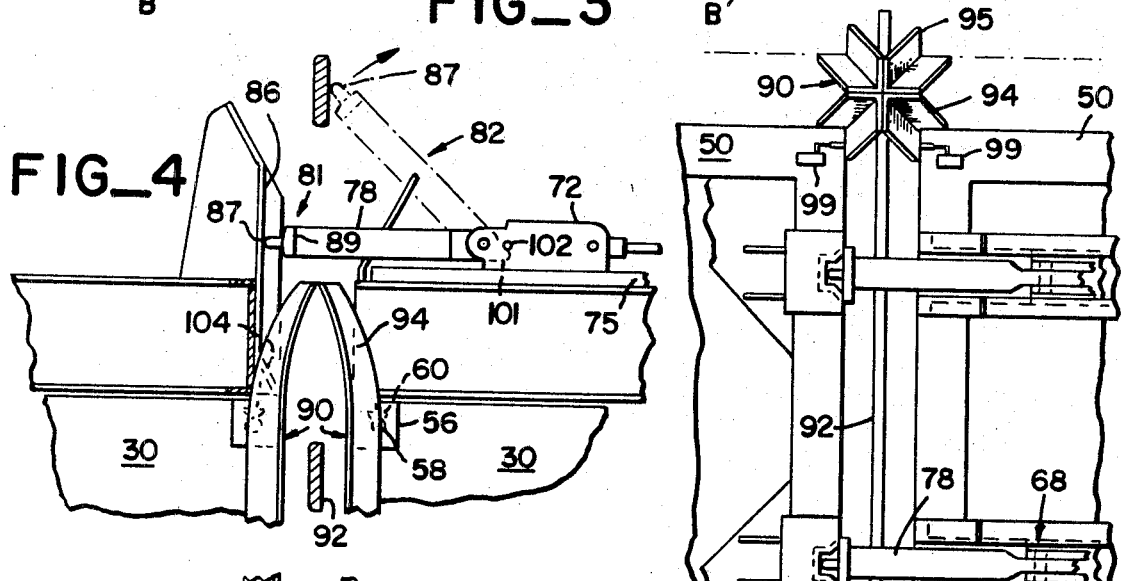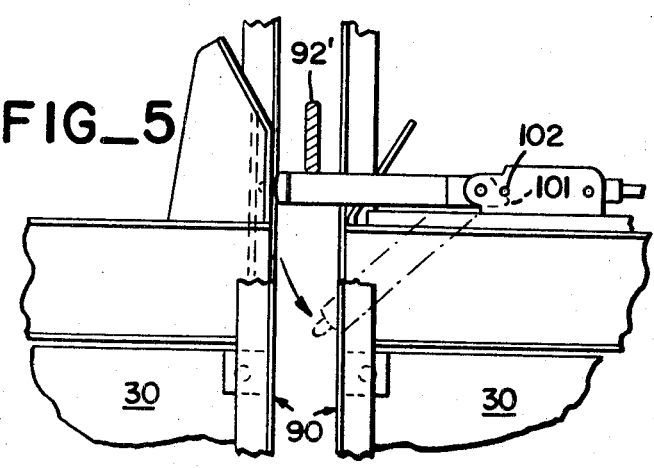

United States Patent Office 3,536,351
Patented Oct. 27, 1970

3,536,351
APPARATUS FOR SIMULTANEOUSLY LIFTING AND SPACING CARGO CONTAINERS
Charles H. Zweifel and Anthony J. De Stasi, Oakland, Calif., assignors, by mesne assignments, to Fruehauf Corporation, Detroit, Mich., a corporation of Michigan
Filed Nov. 13, 1967, Ser. No. 682,462
Int. Cl. B66c 1/00
U.S. Cl. 294—81                                     10 Claims

ABSTRACT OF THE DISCLOSURE

Apparatus for varying the horizontal spacing between simultaneously handled cargo containers or like articles during loading or unloading. The cargo containers are each dependingly fastened to an individual spreader, each spreader being independently supported from lifting apparatus. The lifting apparatus is adapted to raise and lower the independently suspended spreaders together for simultaneous loading and unloading of containers engaged by the spreaders. An adjustable spacing bar or member extends between the spreaders for varying the space between them. The spacing bar or member is adapted to part its connection between adjacent spreaders in response to objects, such as support structures, passing between the adjacent spreaders.

---

This invention relates to apparatus for simultaneously engaging a plurality of cargo containers during loading and unloading thereof and, more particularly, to such apparatus that affords controllably variable separation between the containers as loaded or unloaded.

An object of this invention is to provide an apparatus for simultaneously handling a plurality of cargo containers between two dispositions requiring different spaced relation between the articles with a minimum of lifting apparatus manipulation. Two spreaders, typically horizontal and co-extensive with each container or like cargo article to be handled, are attached to the top portions of adjoining cargo containers. These spreaders are in turn attached to and depend from linear tensional supports such as cables, chains and the like, which are adapted to raise, lower and transport these spreaders together in substantially the same horizontal plane. Attached to the spreaders and extending therebetween is an apparatus for maintaining the spaced apart relation including a spacing bar or member bridging or extending over the desired spatial separation of the spreaders. This spacing bar is actuated by a fluid actuated piston and cylinder or like expedient to permit variation in the spatial separation between spreaders and the containers engaged thereby.

A further object of this invention is to provide a lifting apparatus capable of varying the spacing between a plurality of depending and attached cargo articles which apparatus is adapted for rapid disengagement or parting in response to objects passing between the cargo articles as spaced during vertical movement. Ships especially adapted for carrying containers typically have vertically extending cells into which containers are placed. Each individual cell is delimited by horizontal structural members; such structural members pass between containers and the spreaders engaging the containers as the containers are lowered into the cells. One aspect of this invention provides apparatus that withdraws the spacing bar or member as the containers enter the cells. According to this aspect of the present invention, adjacent spreaders are independently suspended from lifting apparatus and are held in spaced apart relation by a pivotally mounted member extending therebetween. A pivotal mount for this member is attached to one spreader; the other spreader has a recess for receiving the member when it spans the space between the adjoining spreader. A cylinder and piston actuator, attached in driving relation to the member, responds to sensing apparatus when such apparatus detects the proximity of an object passing between the adjoining spreaders and acts to retract the member to avoid interference. In the event of failure of the retracting apparatus, the pivotal mounting of the spacing bar or member permits rotational movement of the member to avoid destruction of the member or damage of the object moving through the spatial interval.

A still further object of this invention is to attain a variable spatial relation between two depending and suspended cargo articles or containers by gravitationally biasing a pair of lifting spreaders relative to one another. Accordingly, the spreaders are dependingly supported so that in cooperation with gravity they seek a pendulum type gravitational movement relative to one another. A member, extending between the spreaders, is compressively loaded to oppose this gravitational pendulum force or bias. The spreaders are maintained with a desired spatial interval therebetween by movement of the separating member in opposition to the gravitational force.

Other objects, features and advantages of this invention will become more apparent with reference to the accompanying drawings in which:

FIG. 1 is a schematic perspective view of a lifting mechanism for simultaneously raising two containers in a spaced apart relation from one disposition at a first spaced apart relation and depositing these same containers at a second disposition in a second spaced apart relation;

FIG. 2 is a front elevation view of two spaced apart containers illustrating the gravitational biasing of the containers toward one another;

FIG. 3 is a plan view illustrating a form of apparatus for varying the space between two cargo container handling spreaders and specifically showing the spreaders with a minimal spacing therebetween;

FIG. 4 is a front elevation view of the apparatus of FIG. 3 illustrating the engagement of the separating mechanism between two spreaders at maximum interval of separation and specifically showing, in broken lines, a pivotally mounted bar or member between adjacent spreaders after pivotal movement thereof in response to the passage of a tension tie bar or cell defining structural member between the adjoining spreaders;

FIG. 5 is an elevation view similar to FIG. 4 and showing the yielded position of the pivotally mounted bar or member after response to an object encountered during the raising of the spreaders;

FIG. 6 is a plan view of the spreaders partially lowered into a ship cell structure; and FIG. 7 is a detail of the spacing member or lock bar and its supporting pivotal mounting illustrating specifically the placement of the shear pin.

With specific reference to FIG. 1, lifting apparatus A dependingly supports each of two spreaders B, which spreaders are retained in spaced apart relationship by a separating apparatus C extending between the spreaders. Lifting apparatus A comprises paired motors 14 that drive pinions 15 which mesh with gears that are connected to cable drum 16. Respective pinions 15 are intercoupled by clutch 17 so as to restrict motors 14 and drums 16 to simultaneous and equal rotation thereby affording simultaneous raising and lowering of spreaders B with cables R that are wound on the drums and connected to the spreaders.

Each spreader B is provided with four sheaves 18 through which cables R is threaded. The cables include vertical tensional portions 20 which pass through sheaves 18 and through trolley pulleys 22 that are carried on a trolley 24. The cables are reeved around one end of the lift apparatus frame (not shown) by means of frame tie downs 27, and at the opposite end are attached to drums 16. Trolley 24 rides on frame rails 28 which are supported overhead by framework that forms no part of the present invention and is not shown. As is apparent, drums 16 are rotated to effect simultaneous vertical movement of spreaders B by taking up or letting out cables 20 while the horizontal position of the spreaders is varied along the length of rails 28 by moving trolley 24 therealong.

Lifting apparatus A, in raising and lowering paired spreaders B, operates such spreaders together to maintain simultaneous vertical movement within the same horizontal plane when clutch 17 intercouples respective pinions 15. While such co-planar simultaneous vertical movement is necessary between paired spreader B to utilize separating apparatus C, it is important to note that lifting apparatus A has the advantage of permitting either of the paired spreaders B of being operated independently of the remaining spreader. Such independent operation is achieved by disengaging clutch 17 so as to uncouple pinions 15. Thereafter, one spreader B is raised to a non-obstructing position by rotation of its coupled driving motor 14 and locked in such position through its respective attached brake 19. The remaining spreader B can then be operated in the conventional manner, it being understood that separating apparatus C is withdrawn to a position of non-interference with respect to both the operated spreader B and support members passing adjacent the operated spreader.

The apparatus described to this point operates to lower spreaders B to an immediate overlying position with respect to a pair of cargo articles or containers 30. The spreaders are provided with container gripping devices that are formed to engage mating parts on the containers. Thus, actuation of motors 14 rotates drums 16 so as to raise the depending spreaders and containers engaged thereby. Vertical movement is effected by rotation of drum 16 in an appropriate direction; horizontal movement is effected by positioning trolley 24 along rails 28.

By reference to FIG. 2, the gravitational bias of adjacent simultaneously handled containers toward one another can be discerned. The cables extending from sheaves 18 to pulleys 22 include inward cable strands 32 which are vertical and outward cable strands 34 which are inclined inwardly so as to depart from true vertical in a direction of the opposite and adjoining spreader. The inclined orientation is achieved by mounting individual spreader sheaves farther from one another than the trolley sheaves are mounted and shortening the inner cable strand 32 with respect to outer strand 34.

As suspended, each spreader B with its attached and depending cargo container 30 will tend to swing toward the adjacent and adjoining cargo article and spreader. This tendency to swing results directly from the tendency of the center of gravity 40 of the container and spreader to seek its lowest gravitational potential and the fact that cables 32 and 34 constrain the spreaders to arcuate movement in the direction of potential arrows 42. The forces on the spreaders are similar to that force exerted by a pendulum stopped at a position where its center of gravity is offset from a vertical position underlying the pendulum pivot.

Containers 30 as gravitationally biased will typically have different cargo loadings therein. As is apparent, a heavily loaded container gravitationally moving about trolley 24 will tend to displace an adjacent lightly loaded container 30 beyond that position where two evenly loaded containers would gravitationally balance one another. In order to keep unevenly loaded containers 30 within the limits of the maximum permissible sway of lifting apparatus A, sheaves spacing 37 and trolley pulley spacing 38 may be varied, both in overlying relationship and in distance between the respective sheaves and pulleys.

Separating apparatus C is shown schematically in FIG. 2 in the form of a bar which opposes the tendency of inward movement of each of the spreaders. As is apparent, variation in the length of the bar will effect a variation in the spatial separation 46 between the adjoining spreaders by opposing their gravitational bias towards one another.

Sheaves 18 are shown in FIG. 2 attached by means of sheaves pivots 48 which permit both free arcuate movement about trolley pulleys 22 and allow the angle of cable incline to increase and decrease with raising and lowering of the spreaders without chafing or derailment of the cable.

As is apparent, any of cables 20 attached to spreaders B could be inclined to produce the desired gravitational bias between the two containers and further either one of the spreaders could be gravitationally biased relative to the other spreader so as to produce the desired bias.

Adjoining spreaders B are illustrated with greater specificity in FIGS. 3 and 4. Typically, spreaders B are coextensive or congruent with containers 30. Each spreader includes a pair of side beams 50 that are joined in parallel spaced relation by a pair of end beams, one of which is shown at 52. Brace beams 54 extend between the central regions of beams 50 and impart rigidity to the spreaders. Each cargo container 30 is provided with a corner casting or block 56 at each corner thereof. Each block has an attachment socket 58 therein for affording attachment between the spreader and the container. Spreader B is equipped for automated attachment to cargo containers 30 a portion of which apparatus is shown in FIG. 4. This attachment is accomplished by attachment lugs 60 located at each corner of spreader B. Lugs 60 are each configured for cooperative grasping engagement with mating sockets 58 in the cargo container 30 being handled. In accomplishing such engagement, lugs 60 first penetrate sockets 58 and thereafter are remotely rotate to effect firm attachment. The remote rotation of lug 60 is accomplished by an actuating apparatus which is not shown and forms no part of the present invention.

Lugs 60 and mating sockets 58 are typically constructed according to the American Standard Association Twist Lock Description as covered by Specifications for Cargo Containers U.S. Standard NH 5.1., a publication of the American Society of Mechanical Engineers.

Spreaders B have been described as overlying containers 30 in a horizontal plane with the illustrated cargo dependingly attached. As is apparent, spreaders B could be other than horizontal and overlying and could further be designed to grip the particular cargo articles to be handled along the side or bottom portions thereof.

Separating apparatus C has a fluid actuated cylinder and piston 62 powered through fluid lines 64. Lines 64 are typically coupled with a fluid energy source located on the spreaders which supplies the necessary power in the form of fluid pressure by such medium as hydraulic oil. Extending from cylinder and piston 62 in ram 65 which by means of transverse shaft 66 connects to bar slide 68, which is constrained for sliding movement along a track 75. Slide 68 has a flat bottom slide member 70 with two centrally located and upwardly extending flat attachment members 72 extending the length of slide member 70. Attachment members 72 are laterally spaced apart to admit ram 65 therebetween and are crossbored to receive transverse shaft 66. A C-shaped slide track 75 accommodates bottom slide member 70 interior thereof within the limits of the movement of ram 65.

Spacing members or lock bars 78 are pivotally mounted to slide bar 68 by a trunnion 80 that extends between attachment members 72 at that end of the slide opposite traverse shaft 66. Lock bar 78 pivots about trunnions 80 between a horizontal pivotal position 81, where engagement with the adjacent spreader D is effected, and a support member clearing position 82 shown in FIG. 4 in the imaginary view. This latter position 82 constitutes a temporary attitude of the lock bar 78 and permits lock bar 78 to rotate away from objects passing between adjoined spreaders B.

Spacing member 78 in the extended horizontal position 81 opposingly resists the gravitational bias of the adjacent spreader B at vertical female recess 86. A penetrating male guide 87 attached to spacing member 78 extends into recess 86 centering the opposing engagement of the lock bar. Collar 89 at the end of member 78 bears against the sides of the spreader adjacent recess 86 forming the point of contact between the adjoined spreaders which opposes the gravitational bias. Hydraulic energy supplied to piston and cylinder 62 moves slide 68 along track which in turn varies the position of spacing member 78 so as to change the spatial relation between spreaders B and their depending cargo articles 30. As is apparent, cylinder and piston 62 may be actuated between a position of extension and complete retraction of ram 65 so as to achieve the desired spatial relationship between adjoining spreaders B to suit the particular requirements of any ship, dock or other mode of conveyance onto which containers 30 are loaded.

It will be noted that female recess 86 is vertically elongate and adapted to accommodate spacing member 78 at any interval along its entire length. As is apparent, cables 20 of lift apparatus A will elastically stretch with variations in the weight of spreaders B and containers 30. As the weight of one simultaneously handled container increases in relation to the weight of its adjacent and simultaneously handled counterpart, the elastic properties of cable 30 will cause the spreaders B and containers to vary slideably in elevation relative to one another. Vertical female recess 86 has a length sufficient to accommodate all such variations within the elastic limits of lift apparatus A.

As has previously been described, one of the major difficulties experienced by any mechanism separating adjacent spreaders B will be the encounter of the separating adjacent spreaders B will be the encounter of the separating mechanism C with objects passing between the containers and spreaders during raising and lowering. Typically, when such containers are placed interior of ships or other modes of conveyance, there will be provided cell systems having various structural members designed for the support of stacked containers under the dynamic loadings experienced in transport. Such supports are illustrated in FIGS. 4, 5 and 6 and typically comprise columns 90 at the corners of the containers stacks having tension tie bars 92 extending therebetween. As illustrated, each of the columns has a taper 94 which serves to guide the initial entry of the container 30 into the support structure and guide plates 95 which slideably engage the corner portions of the containers interior of the support structure or cell system.

During the lowering into such a cell system, containers 30 will slideably engage column taper 94 at the bottom portions thereof. The arcuate shape of taper 94 will center containers 30 for slideable engagement with guide plates 95. Once containers 30 are partially interior of the cell structure, further separation by separating member 78 is not necessary.

When separting member 78 is in the extended position, during movement of spreaders B interior of the cell structure, it can interfere with and damage the structure members of the cell system such as tension tie bars 92. To avoid such interference or damage, the spreader B to which hydraulic cylinder and piston is attached is equipped with descent limit switches 99. These switches are attached at a portion of the spreader B which comes into slideable contact with the cell structure.

Specifically referring to FIG. 6, limit switches 99 are illustrated attached to the corners of the spreader B where they come into contact with column taper 94 and column guide plates 95 during lowering of the adjoined spreaders B into the cell structure. These switches communicate with the fluid energy source, typically by means of an electrical signal, actuating cylinder 62 to retract spacing member 78 from its extended position before container lowering movement places separating member 78 in jeopardy of destruction by contact with structural cell tie member 92 or equivalent supporting structure.

Unfortunately, modern cargo handling apparatus, utilizing spreaders for the handling of cargo articles, is commonly designed for rapid speeds of lowering so as to expedite the placement of the containers interior of a cell structure. Such rapid speeds of lowering interior of the cell structure may not permit a sufficient interval of time to occur for complete hydraulic retraction of spacing member 78. Furthermore, in the event that separating apparatus C has failed to retract upon spreaders B coming into proximity with the cell structure, either the separating member 78 or the structural members in the cell structure could be damaged by the resulting contact.

To prevent such damage, separating member 78 is mounted to bar slide 68 by means of trunnion 80 which permits rotatable movement of the tie bar from a horizontal extended position 81 to support member clearing position 82 through an arc of rotation. When spreaders B descend with a tension tie bar therebetween, separating member 78 will strike the bar during passage. Upon striking tie bar 92, spacing member 78 will rotate about trunnion 80 free and clear of tie bar 92. Simultaneously, penetrating male guide 87 will slide interior of recess 86, passing through the open top portion thereof, while collar 89 will slideably pass out of engagement with the opposing spreader. Disengagement of the spacing member 78 will thus be effective instantaneous.

Once containers 30 and coupled spreaders B have entered interior of cell guidance structure 90 spacing of containers 30 will be controlled by the columns 90. No load will exist on spacing members 78 nor on recess 86. Typically, spacing members 78 will be retracted by the illustrated hydraulic retraction apparatus to a position clear of tension tie bars 92 or other equivalent structure.

Hydraulic cylinder 62 could, however, through malfuction of the attached actuating apparatuses fail to retract spacing members 78. In such a failure, the member 78 would be in the extended and horizontal position where it would interfer with the simultaneous raising of the spreaders by coming in contact with members such as tie bar 92' passing through the spatial interval between separated spreaders. If the spacing member is not free to rotate below its horizontal position in response to an object passing between the separated spatial interval between the spreaders, the tension tie bars or the spacing member 78 may well be damaged or broken.

To safeguard against such inadvertant horizontal positioning of spacing member 78 as well as mistaken positioning of separating apparatus C when spreaders B are interior of the cell structure, spacing member 78 is limited in its rotation about trunnions 80 by means of a shear pin 102.

As illustrated specifically in FIGS. 5 and 7, slide 68 is crossbored through paired attachment members 72 immediately behind trunnion 80. Interior of these crossbores there is inserted a shear pin 102. Spacing member 78 immediately behind trunnions 80 has a flat, shear pin engaging surface 101 which pivotally engages the shear pin as the bar angularly descends from the vertical position to the horizontal and extended position. Shear pin 102 has sufficient structural rigidity to resist the force of bar or member 78 falling from the vertical position to the horizontal position.

Upon striking an object during the raising of lifting apparatus A, separating member 78 will have a rotational force imparted thereto about trunnions 80. This rotational force will destroy shear pin 102 and cause the member to depend angularly downward from bar slide 68. Simultaneous with such rotation, penetrating male member 87 will be forced downwardly interior of vertical frame recess 86 and forceably pass out of engagement with this recess along recess taper 104. Once shear pin 102 has been destroyed, separating member or bar 78 will depend from slide 68 in a readily observable disposition where the operating crew may readily observe the depending member and replace the destroyed pin.

Separating member 78 has been illustrated suspended by trunnions 80 and restricted in the horizontal position by shear pin 102. As is apparent, the pivot of separating member 78 may be restricted by such other means as brakes, sacrificial cotter keys and similar devices to effect the desired safety separation.

Although the foregoing invention has been described in some detail by way of illustration and example for the purposes of clarity and understanding, it is understood certain changes and modifications may be practiced within the spirit of the invention as limited only by the scope of the appended claims.

What is claimed is:

1. Apparatus for simultaneously transporting a plurality of cargo containers comprising: first and second spreaders; means for engaging a container attached to each spreader; means for simultaneously moving said container engaging means together between a first location and a second location; means for maintaining said container engaging means in spaced apart relation including a member extending between said spreader means, said member mounted for movement away from the extended position between said spreaders in response to an object passing between said spreaders.

2. Apparatus according to claim 1 wherein said maintaining means includes, a member extending between said spreader means pivotally mounted for movement away from an extended position between said spreaders in response to said object passing between said spreaders.

3. Apparatus according to claim 1 and wherein said maintaining means includes a fluid actuated cylinder and piston adapted to expand and contract said spaced apart relation respectively.

4. A spreader system for varying the spacing between a plurality of depending and attached cargo articles, each of said articles fastened to a spreader, said system comprising: a plurality of spreaders, each of said spreaders including means for attachment to at least one depending cargo article; means for raising and lowering said spreaders simultaneously while maintaining said spreaders in substantially the same horizontal plane; said means for raising and lowering said spreaders including means for gravitationally biasing said spreaders relative to one another; means for maintaining said spreaders in spaced apart relation attached between said spreaders including a member connected to said spreaders opposing said gravitational bias; and means for disconnecting said member from between said spreaders in response to objects passing between said spreaders.

5. A spreader system according to claim 4 and wherein said member connecting said spreaders includes a male member attached to one spreader and a female member attached to the other spreader in opposing cooperative engagement; said members including means for permitting vertical sliding movement between said members at their point of opposing cooperative engagement.

6. Apparatus for simultaneously transporting a pair of cargo containers comprising: first and second spreader means, each said spreader having means for engaging one of said containers, means for simultaneously moving said container engaging means between a first and second location; and remotely controlled power means having relative movable members connected between said spreaders for adjustably varying the horizontal spaced apart relation between said spreader means to any preselected interval between a maximum and a minimum spaced apart relation during movement of said respective containers between said first and second locations.

7. Apparatus according to claim 6 and wherein said space maintaining means includes means for providing a force biasing said spreader means relative to one another; and remotely expansible means extending between said spreader means for opposing said biasing force.

8. Apparatus according to claim 7 and wherein said expansible means is adapted to pivotally move away from said extended position in response to an object passing between said spreader means.

9. A twin lift spreader system wherein a plurality of depending cargo containers are transferred between a first disposition and a second disposition and the horizontal spatial relation between said cargo containers is changed during said transfer, said system comprising: a pair of spreaders each having means for attachment to at least one of said depending cargo containers; each of said spreaders depending from a plurality of linear supports and supported in substantially the same horizontal plane; means for transporting said spreaders between said first and second disposition including means for simultaneously raising and lowering said linear supports; remotely controlled power means having relative movable members between said spreaders for maintaining said spreaders in spaced apart relation attached to said spreaders operable to remotely vary the spacing of said containers to any preselected spatial separation between a maximum and a minimum spatial separation during operation of said transporting means.

10. The invention of claim 9 and wherein said maintaining means includes at least one linear support attached to one spreader out of true vertical for gravitationally biasing one spreader relative to the other spreader, and a remotely expansible extended member between said spreaders adapted to establish a first preselected spaced relation between said spreader at said first disposition and said second preselected spaced relation at said second disposition.

References Cited

UNITED STATES PATENTS

| 1,433,993 | 10/1922 | Fitch | 294—67 |
| 1,983,053 | 12/1934 | Spiegl | 294—67 |
| 2,987,340 | 6/1961 | Mattera | 294—67 |
| 3,365,229 | 1/1968 | Hitch | 294—67 |

HARVEY HORNSBY, Primary Examiner

U.S. Cl. X.R.

212—11, 14, 128; 254—144